United States Patent

Morchand

[15] 3,637,926

[45] Jan. 25, 1972

[54] SYSTEM FOR TRANSMITTING TWO CLASSES OF SUPERIMPOSED INFORMATION

[72] Inventor: Charles A. Morchand, New York, N.Y.

[73] Assignee: Data-Plex Systems, Inc., New York, N.Y.

[22] Filed: Oct. 2, 1968

[21] Appl. No.: 764,523

Related U.S. Application Data

[63] Continuation-in-part of Ser. No. 754,013, Aug. 20, 1968, abandoned.

[52] U.S. Cl. .............................................................178/5.6
[51] Int. Cl. .........................................................H04n 7/08
[58] Field of Search ...........................................178/5.6, 5.1

[56] References Cited

UNITED STATES PATENTS 3,456,071 7/1969 Jackson et al. .........................178/5.6

*Primary Examiner*—Robert L. Griffin
*Assistant Examiner*—Barry Leibowitz
*Attorney*—Hane, Baxley & Spiecens

[57] ABSTRACT

A television system comprises a television transmitter and a television receiver. The television transmitter includes a source of fields of first or general viewer information and a source of at least one field of second special viewer information. Means superimposed at least a portion of the field of second viewer information on a field of first viewer information to create at least one superimposed field. The fields of first viewer information are transmitted with the superimposed field or fields interposed therein. The television receiver receives the transmitted fields. Included in the receiver are means for separating out from the superimposed field or fields the field of second viewer information or portion thereof and for displaying that field of second viewer information.

10 Claims, 1 Drawing Figure

PATENTED JAN 25 1972 3,637,926
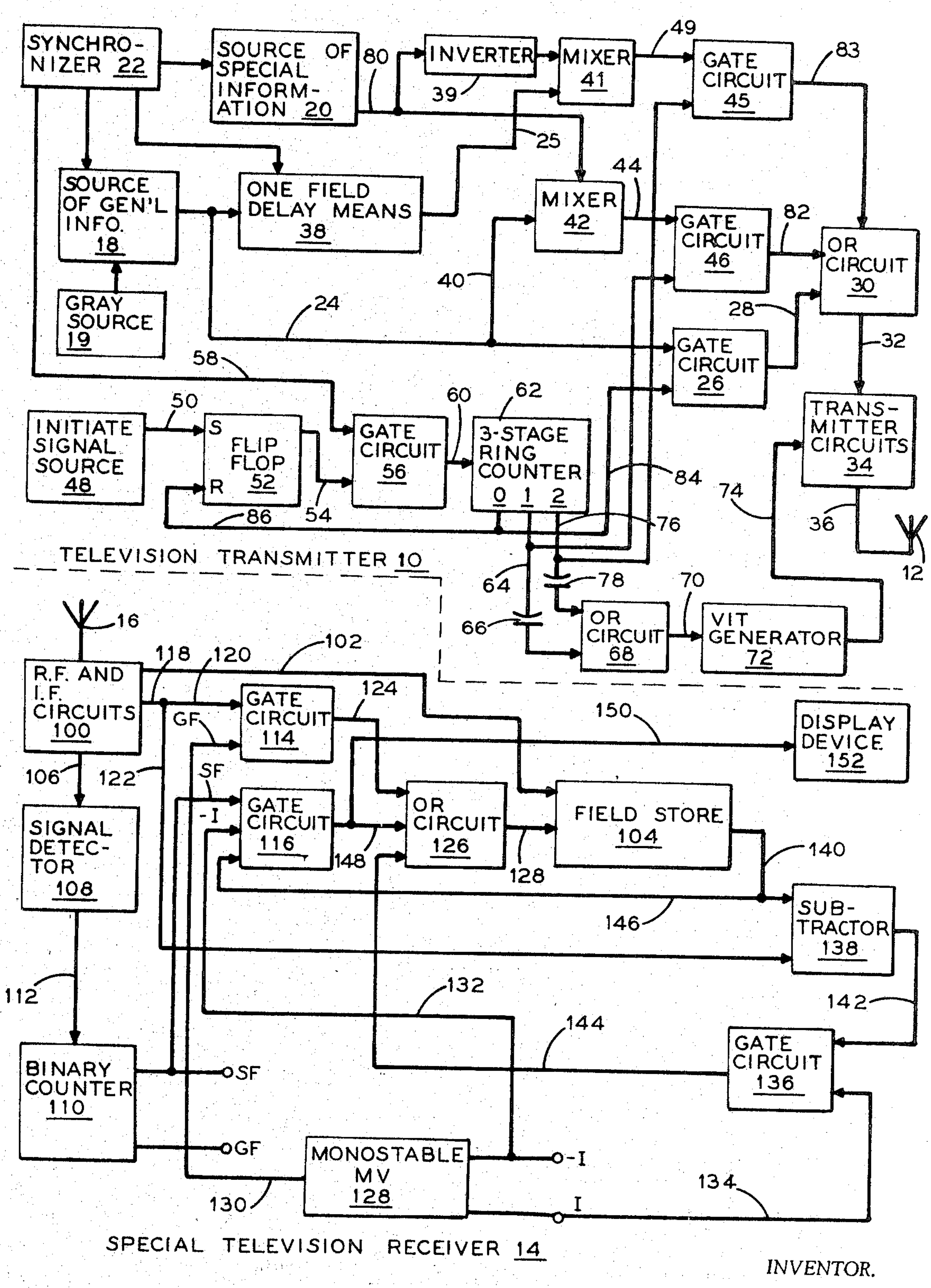
INVENTOR.
Charles A. Morchand

SYSTEM FOR TRANSMITTING TWO CLASSES OF SUPERIMPOSED INFORMATION

This invention pertains to information transfer systems and more particularly to improvements in television transmission systems which simultaneously transmit two classes of information and is a continuation-in-part of my application of the same title, Ser. No. 754,013, now abandoned, filed on or about Aug. 20, 1968.

In my other copending application Ser. No. 718,298, filed Mar. 15, 1968, for Television System for Two Classes of Information, now abandoned, I disclosed a system for transmitting special viewer information embedded in the fields or frames of general viewer information.

Such a system has created a demand for even better systems wherein the fields of second viewer are completely disguised to a viewer of the first or general viewer information.

It is a prime object of the present invention to provide such a system.

Briefly, the invention contemplates a television transmission system comprising a source of fields of first viewer information and a source of at least one field of second viewer information. Means superimpose on at least one of the fields of first viewer information a field of second viewer information to form a superimposed field. Means transmit the fields of first viewer information with the superimposed field interposed therein. Receiver means receive the transmitted fields. The receiver means includes means for separating out from the superimposed field the field of second viewer information and for displaying the same. A feature of the invention is concerned with superimposing the field of second viewer information on two of the fields of first viewer information wherein one of the superimposed fields is the visual inverse of the other.

Other objects, the features and advantages of the invention will be apparent from the following detailed description of the invention when read with the accompanying drawing whose sole FIGURE shows by way of example and not limitation a television transmission system in accordance with the invention.

In the sole FIGURE, a television transmitter 10 transmits via antenna 12 television signals representing fields of general viewer information in which there is interspersed fields of special viewer information superimposed on the fields of general viewer information.

The television signals are picked up by conventional receivers (not shown) whose viewers do not see the superimposed special information because of the visual masking techniques used, and by at least one special television receiver 14 via antenna 16. Circuitry in receiver 15 extracts the fields of special viewer information.

In particular television transmit 10 includes a source of general viewer information 18 and a source of special viewer information 20. Both sources are under control of a conventional television synchronizer 22 which generates the usual vertical, horizontal and blanking sync pulses.

In normal operation the signals representing the fields of general viewer information, hereinafter called general viewer fields are fed via line 24, gate circuit 26 (now open because of a signal on line 84 from the "0" output of counter 62), line 28, OR-circuit 30, line 32, transmitter circuits 34 and line 36 to antenna 12. In addition, the general viewer fields pass via delay means 38, line 25, mixer 41, where they are mixed with the inverse of a special viewer field from source 20 via inverter 39, and line 49 to gate circuit 45 which is closed at this time. At the same time, these same general viewer fields pass via line 40, mixer 42 where they are mixed with the special field from source 20 and line 44 to gate circuit 46 which is closed at this time. Thus only pure fields of general viewer information are transmitted.

Now when it is desired to transmit a field of special viewer information, the initiate signal source 48 emits a pulse which is fed via line 50 to the set input of flip-flop 52 (assumed to be initially cleared to the clear state by means not shown). The output of flip-flop 52 feeds a signal to line 54 which opens gate circuit 56. The next occurring vertical sync pulse, transmitted by synchronizer 22, on line 58 passes through gate circuit 56 and line 60 to the count input of three-stage ring counter 62 causing it to step from the "0" state to the "1" state. (Counter 62 was initially set to the "0" state by means not shown.) The "1" output of counter 62 emits a signal which passes via line 64, differentiating capacitor 66, OR-circuit 68 and line 70 to the input of vertical interval test signal generator 72. Signal generator 72 emits a first characteristic signal, associated with the upcoming field, the characteristic signal is fed via line 74 to the transmitter circuits 34 where it is incorporated with the television signals and fed via line 36 to antenna 12 for broadcast. The "1" output of counter 62 opens gate circuit 46 so that the output of mixer 42 passes through OR-circuit 30 for transmission. Now the output of mixer 42 is the next occurring general viewer field with a special viewer field superimposed thereon.

The next occurring vertical sync pulse also passes through gate circuit 56 to step the ring counter 62 to the "2" state which causes the generation of a signal from the "2" output. The signal on the "2" output is fed via line 76, differentiating capacitor 78, OR-circuit 68 and line 70 to the input of signal generator 72 which generates a second characteristic signal for broadcast as previously described. In addition, the signal on line 76 opens gate circuit 46. Now, the preceding field of general viewer information that passed through gate circuit 46 is just starting to exit from delay means 38 and to enter one input of mixer 41 where it has superimposed thereon the inverse of the field of special viewer information being fed from source 20 via line 80 and inverter 39 to the second input of mixer 41. The superimposed field passes via line 49, gate circuit 45, line 83, OR-circuit 30 and line 32 to transmitter circuits 34 for broadcast.

The next occurring vertical sync pulse also passes through gate circuit 56 to step ring counter 62 to the "0" state. The signal from the "2" output thereof terminates, closing gate circuit 45, and the signal from the "0" output is again generated, opening gate circuit 26. In addition, the signal generated at the "0" output of the counter is fed via line 86 to the clear input R of flip-flop 52 which is cleared thereby, terminating the signal on line 54, blocking gate circuit 56. Thereafter, fields of general viewer information continue being transmitted from source 18 via line 24, gate circuit 26, line 28, OR-circuit 30 and line 32 to transmitter circuits 34, while at the same time these fields delayed one field time are still mixed with the special viewer field in mixer 42. However, because gate circuits 45 and 46 are blocked, these superimposed fields are not transmitted until the generation of another signal by initiate signal source 48.

In summary, assuming that successive general viewer fields are represented by the quantities $A_1$, $A_2$, $A_3$ . . . and a special viewer field by the quantity B the operation that occurred for each state of the counter 62 is as follows: For the "0" state, the quantity $A_1$ is transmitted; for the "1" state, the quantity $A_2+B$ is transmitted; and for the "2" state, the quantity $A_2-B$ is transmitted where $-B$ represents the inverse of the quantity B. The effect that these two superimposed fields adjacent to each other have on the eye of a general viewer is to perceptually cancel each other leaving an average gray level. Now, if this gray tone is measured and duplicated and is superimposed on at least a series of frames prior to the initiate signal and is again superimposed on at least a series of frames after the two fields (A+B) and (A−B), there should be no perceivable evidence of the INTERPLEX of special information on the general viewer information receivers. In the process of superimposition the gray level should be at approximately 5 percent of pedestal and a gray tone for superimposing can be at 8 percent or less amplitude. This gray tone can be generated by gray source 19 which generates a video signal of the appropriate amplitude which is mixed in with the regular video signal of source 18. The "gray signal" can be constant or only keyed in to the frames encompassing the superimposed frames.

The broadcasted signals are picked up by the antenna 16 and fed to the RF and IF circuits 100 of special television receiver 14 which, for the present, feeds vertical sync pulses via line 102 to field store 104 which is storing a previously extracted field.

When the first characteristic signal is received by circuits 100 it is fed via line 106 to signal detector 108 which generates a pulse that is fed to binary counter 110 via line 112 causing the generation of the GF signal and the termination of the SF signal. Note this characteristic signal is at the start of the field containing the quantity $A_2+B$. The GF signal opens gate circuit 114 and the termination of the SF signal closes gate circuit 116. With gate circuit 114 open, the general viewer field with the special viewer field superimposed passes from circuits 100, via line 118, line 120, gate circuit 114, line 124, OR-circuit 126 and line 128 to field store 104 replacing the previously stored field. At the end of this received field, the second characteristic signal (preceding the field containing the quantity A—B) is received and results in the transmission of another pulse signal from detector 108 to switch binary counter 110 which now terminates the GF signal and starts transmitting the SF signal. The trailing edge of the GF signal fed to the input of monostable multivibrator 128, via line 130, triggers the multivibrator to emit and I and a —I signal each lasting one field time. The —I signal on line 132 blocks gate circuit 116 for one field time while the I signal on line 136 opens gate circuit 136 for one field time. The field following the second characteristic signal is the same field of general viewer information with the inverse on the field of special viewer information superimposed thereon, i.e., $A_2-B$. It cannot enter the field store 104 because gate circuit 114 is blocked. However it passes via line 122 to one input of signal subtractor 138 which receives in synchronism therewith at its second input, connected via line 140 to the output of field store 104, the precedingly received field. The subtractor 138 subtracts the signals on line 140 from the signals on line 122 and feeds the different signals (the special viewer field) via line 142 to gate circuit 136. Since gate circuit 136 is now open because of the presence of the I signal on line 134, the special viewer field passes via line 144, OR-circuit 126 and line 128 into field store 104. Using the previously defined quantities, the subtraction operation may be summarized by the following equation:

$$(A_2+B)-(A_2-B)=2B.$$

It should be noted that normally, the contents of the field store 104 recirculate via the following path from field store 104, via line 140, line 146, gate circuit 116, line 148, OR-circuit 126, and line 128 to field store 104. However, when the first field after the first characteristic signal was gated into the field store 104 under control of the GF signal at gate circuit 116 blocked that gate circuit and the then recirculating field was "erased." Now it is necessary to erase said first field. At this time, the SF signal is present at gate circuit 116, however a —I inhibiting signal is present on line 132 and the gate circuit remains blocked. The —I inhibiting signal terminates after one field time so that the recirculation path is reopened just as the special viewer field starts leaving the field store 104 for the first time. This field continues recirculating and is stored until another characteristic signal is received.

Now the output of gate circuit 116 is fed via line 150 to display device 152 for viewing by a special viewing user. Thus it is seen that the field preceding the superimposed field is used to extract out the special viewer field superimposed on the general viewer under the control of characteristic signals.

The various components of the system will now be described. Synchronizer 22 can be a conventional TV synchronizing pulse generator which generates the usual blanking, vertical and horizontal sync pulses. The source of general viewer information can be the conventional cameras and circuitry associated with live shows or video tapes systems or the like. The video signals can be 5 percent of pedestal, for example. The special source of information can be a television camera focused on a slide projection system, a document, or the like. However, a reduced signal level should be used. For example, if the slides are black text on a white background, the white should be adjusted to the 8 percent level. This can be accomplished by adjusting the signal input to the mixers 41 and 42 to that level or by reducing the gain of the camera to that level. The mixers 41 and 42 can be conventional signal mixing circuits. The gate circuits, OR circuits, flip-flops, multivibrators and counters are well-known devices in the computer art. However, the gate and OR circuits should have a band pass for video signals. The initiate signal source can be a pushbutton device or even a programmed pulse generator. The one field delay means 38 and the field store 104 can be video disk devices such as shown in my copending application for Reconstructable Television Transmission System, Ser. No. 718,668, filed Apr. 4, 1968 or the Panasonic Video Sheet Recorder or the Ampex HS—100 High-Band Disk Video Recorder Reproducer. The transmitting circuits can be conventional television transmitting circuits including the modulators audio and video circuits etc. The signal generator 72 can be a vertical interval test signal generator which places a characteristic signal in the last line of a field or in the vertical blanking area of the field signals. The RF and IF circuits can be those of a conventional television receiver and would include also the video circuits up to the cathode ray tube as well as the sync pulse detectors. The signal detector 108 would be determined by the form of the characteristic signals. If these signals are tones or combinations thereof appropriately tuned circuits could be used. If the signals are pulse code modulated the appropriate decoders could be used. The subtractor can be a conventional difference analog amplifier having a video passband. The display device can be one or a plurality of conventional television sets, a frame store device or even a transmitter feeding other television sets, with storage capabilities, a hard copy generator, an operator interaction or teaching device, an information retrieval terminal, etc.

While only one embodiment of the invention has been shown and described in detail, there will now be obvious to those skilled in the art many modifications and variations satisfying the objects of the invention but which do not depart from the spirit thereof.

For example, if desired the field store can be a frame store to store both odd and even fields of inserted information as well as performing the video subtractor for both odd and even fields. The signals preceding odd and even fields can be differentiable, for example, different frequencies of modulation can be used to control proper access to the frame store.

It should be noted that delay means 38 may not be required under all circumstances. In fact, if adjacent fields of general viewer information only change slightly then it is not necessary to repeat the frame for the two different superpositions.

While the field store has been indicated as a video disk, it is also possible with some sacrifice in quality to intermittently sample the video signals and convert them to binary valves which are stored in a magnetostrictive or other type of delay line. In addition, other delays such as a long persistent phosphor CRT system can be used.

Furthermore, the special frames after extraction can be accumulated in a video tape recorder for subsequent viewing as a motion picture.

Finally, in some cases it may not be necessary to blend in the gray tone because of the nature of the special frames.

While only one embodiment of the invention has been shown and described in detail, there will now be obvious to those skilled in the art many modifications and variations which do not depart from the spirit of the invention as defined in the following claims.

What is claimed is:

1. A television transmission system comprising a source of fields of first viewer information, said source emitting the fields sequentially, means for duplicating one of the sequentially emitted fields of first viewer information so that two adjacent fields have the identical viewer information, a source of at least a portion of a field of second viewer information, means for superimposing the field of second viewer information on one of the two adjacent fields of first viewer information to form a superimposed field, means for transmitting said fields of first viewer information and said superimposed field interposed therein, and means for receiving the transmitted fields, said receiving means including means for separating out from the superimposed field the field of second viewer information and means for displaying the field of second viewer information.

2. The television transmission system of claim 1 wherein the video signals of fields of first viewer information are no more than 8 percent of pedestal.

3. The television transmission system of claim 1 wherein the signals of the field of second viewer information are limited to being no more than 10 percent of full video amplitude.

4. The television transmission system of claim 2 wherein the signals of the field of second viewer information are limited to being no more than 10 percent of full video amplitude.

5. The television transmitter system of claim 1 wherein said superimposing means superimposes the inverse of the field of second viewer information on the other of the two fields having the same viewer information.

6. The system of claim 1 further comprising means for introducing a gray tone representing signal into at least the fields of general information adjacent said superimposed field.

7. The television transmission system of claim 1 wherein said separating means of said receiver means comprises means for subtracting the signals representing the superimposed field and a field adjacent thereto.

8. A television transmission system comprising a source of fields of first viewer information, said source emitting the fields sequentially, means for duplicating one of the sequentially emitted fields of first viewer information so that two adjacent fields have the identical viewer information, a source of at least a portion of a field of second viewer information, means for superimposing the field of second viewer information on one of the two adjacent fields of first viewer information to form a superimposed field, means for superimposing the inverse of the same field of second viewer information on the other of the two adjacent fields of first viewer information to form a second superimposed field, means for transmitting said fields of first viewer information with the two superimposed fields interposed therein, and means for receiving the transmitted fields, said receiving means including means for subtracting the signals representing the two superimposed fields to extract only the signals representing the field of second viewer information and means for displaying said field of second viewer information.

9. The television transmitter of claim 8 wherein the video signals of fields of first viewer information are no more than 8 percent of pedestal.

10. The television transmitter of claim 8 wherein the signals of the field of second viewer information are limited to being no more than 10 percent of full video amplitude.

* * * * *